(12) United States Patent
Gilbert et al.

(10) Patent No.: US 8,157,033 B2
(45) Date of Patent: Apr. 17, 2012

(54) STEERING SYSTEM FOR A TRACKED VEHICLE

(75) Inventors: Sylvain Gilbert, Saint-Prime (CA); Daniel Paré, Saint-Prime (CA); Robert Gagnon, Roberval (CA)

(73) Assignee: Les Produits Gilbert Inc., Roberval, Quebec (CA)

( * ) Notice: Subject to any disclaimer, the term of this patent is extended or adjusted under 35 U.S.C. 154(b) by 115 days.

(21) Appl. No.: 12/694,944

(22) Filed: Jan. 27, 2010

(65) Prior Publication Data
US 2011/0180332 A1   Jul. 28, 2011

(51) Int. Cl.
*B62D 11/04* (2006.01)
(52) U.S. Cl. ..................................... 180/9.44; 180/6.48
(58) Field of Classification Search ............... 701/41
See application file for complete search history.

(56) References Cited

U.S. PATENT DOCUMENTS

| | | | |
|---|---|---|---|
| 1,665,470 A | 4/1928 | Wagner | |
| 1,810,138 A | 3/1931 | Kincannon | |
| 2,356,931 A | 8/1944 | Benger | |
| 3,710,886 A | 1/1973 | Wagner | |
| 3,774,707 A * | 11/1973 | Bridwell et al. | 180/6.48 |
| 3,917,014 A * | 11/1975 | Ward | 180/6.48 |
| 3,976,153 A | 8/1976 | Lateur | |
| 4,448,273 A | 5/1984 | Barbieri | |
| 4,821,824 A | 4/1989 | Gilbert | |
| 4,865,141 A | 9/1989 | Gey | |
| 5,343,960 A | 9/1994 | Gilbert | |
| 7,506,717 B2 * | 3/2009 | Tatsuno et al. | 180/307 |
| 7,712,555 B2 * | 5/2010 | Krieger | 180/6.48 |

* cited by examiner

*Primary Examiner* — Tony Winner
(74) *Attorney, Agent, or Firm* — Merchant & Gould P.C.

(57) ABSTRACT

A steering system for a vehicle having left and right endless tracks, left and right sprocket wheels, a motor and a hydraulic pump includes left and right hydraulic motors mounted to a respective one of the left and right sprocket wheels, a hydraulic circuit connecting the fluid outlet of each hydraulic motor to the fluid inlet of the other hydraulic motor, and a steering mechanism for receiving hydraulic pressure from the hydraulic pump and selectively distributing it to the first and second hydraulic motors. The steering mechanism is in fluid communication with the fluid inlets of the left and right hydraulic motors to provide hydraulic pressure in response to first and second steering inputs from a user. An attachment kit includes the steering system.

12 Claims, 5 Drawing Sheets

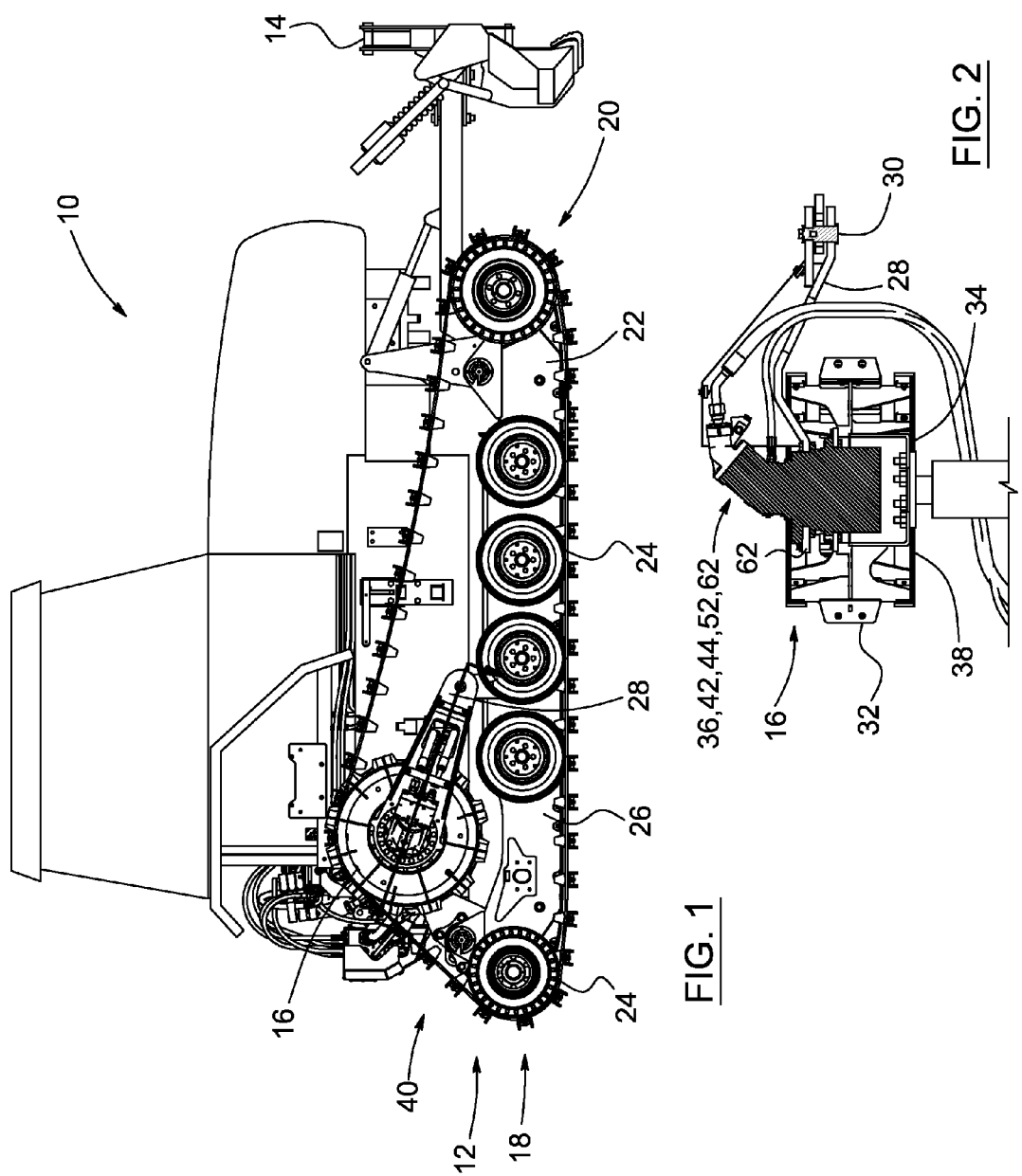

STEERING SYSTEM FOR A TRACKED VEHICLE

FIELD OF THE INVENTION

The present invention relates to steering systems. More specifically, the invention relates to a steering system for a vehicle having a pair of continuous tracks.

BACKGROUND OF THE INVENTION

Tracked vehicles, that is vehicles whose motion over a surface is imparted by continuous belt-like "tracks" rather than a set of wheels, are known in the art. Vehicles such as earth-movers, tanks and various off-road vehicles can be provided with two or more continuous tracks, also called caterpillar tracks, which provide an increased area of contact between the vehicle and the ground. This increased contact area increases traction and is advantageous in many off-road situations, such as on snow, sand or soft earth. A track can be made of a continuous flexible belt or a plurality of rigid belt elements which are hingedly joined to one another.

It is known to provide tracked vehicles with four or more tracks which can be steered by directing the two front-most tracks, much as a conventional car is steered. It is more common however for tracked vehicles to comprise a single pair of tracks, one extending along either side of the vehicle. Such vehicles can be steered by varying the speed of one of the two tracks. To turn to the left, the right track is accelerated and/or the left track is decelerated. It is therefore known to provide the driver independent control of each track in order to enable turning. Typically, this independent control is enabled by having a motor drive a hydraulic pump, which in turn independently powers left and right side hydraulic motors.

However, because the market for such tracked vehicles is relatively small, it is also known to provide attachments or kits for adapting a conventional tractor to run on tracks. Such an attachment conveniently allows the use of a wheeled vehicle in the summer and a tracked vehicle in the winter.

However, conventional tractors typically comprise a pair of steered front wheels and a pair of driven rear wheels whose motive power comes from a motor through a transmission and a differential. When adapting such a tractor to run on tracks, the driven rear wheels are typically replaced with sprocket wheels which are used to drive the tracks. This arrangement is well suited for driving the tractor forwards or backwards, but conventional tractors do not typically provide independent control of the speed of the rear wheels. Various steering systems have been proposed to for conventional tractors adapted to run on tracks.

U.S. Pat. No. 5,343,960, issued Sep. 6, 1994 to Sylvain Gilbert, describes an attachment for converting a rear wheel drive tractor into a tracked snow grooming vehicle. A snow plow is mounted to the rear of the tractor and the converted tractor is steered by hydraulically actuating the coupling between the tractor and the trailing snow plow so as to control the orientation of the plow and thereby induce turning.

U.S. Pat. No. 3,710,886, issued Jan. 16, 1973 describes a mechanism for converting a wheeled vehicle into a tracked vehicle wherein the steering is accomplished by controlling the braking of the tracks in order to steer the vehicle.

Also known in the art are U.S. Pat. Nos. 1,665,470, 1,810,138, 2,356,931, 3,976,153, 4,448,273 4,821,824 and 4,865,141 which describe different continuous track devices for providing track propulsion for a vehicle.

However, it would be advantageous to provide an improved steering system for vehicles propelled by endless tracks which could operate in a more efficient manner than existing system. In particular, it would be advantageous to provide a steering system which varies the speed of the tracks in order to steer without employing the braking system, which represents an undesirable loss of motive power. It would also be advantageous to provide such a steering system which could be used to convert a rear wheel driven wheeled vehicle to a tracked vehicle.

SUMMARY OF THE INVENTION

In accordance with one aspect of the present invention, there is provided a steering system for a vehicle having left and right endless tracks for propelling the vehicle, left and right sprocket wheels for driving a respective one of the left and right endless tracks, a motor for providing primary motive power to the sprocket wheels and a hydraulic pump. The steering system includes left and right hydraulic motors each mounted to a respective one of the left and right sprocket wheels, a hydraulic circuit connecting the fluid outlet of the left hydraulic motor to the fluid inlet of the right hydraulic motor and the fluid outlet of the right hydraulic motor to the fluid inlet of the left hydraulic motor, thereby permitting the flow of hydraulic fluid between the left and right hydraulic motors, and a steering mechanism for receiving hydraulic pressure from the hydraulic pump and selectively distributing it to the first and second hydraulic motors. Each hydraulic motor includes a fluid inlet and a fluid outlet. Each hydraulic motor is able to provide an additional motive power to the respective one of the left and right sprocket wheel in response to a hydraulic pressure being provided at fluid inlet thereof. The steering mechanism is in fluid communication with the fluid inlet of the left hydraulic motor to provide the hydraulic pressure in response to a first steering input from a user, and also in fluid communication with the fluid inlet of the right hydraulic motor to provide a hydraulic pressure in response to a second steering input from a user.

In accordance with another aspect of the present invention, there is provided an endless track attachment kit adaptable to a vehicle having a motor and a hydraulic pump. The kit includes left and right endless tracks for propelling the vehicle, left and right sprocket wheels for driving a respective one of the left and right endless tracks and which can be provided motive power by the motor, a frame for supporting the vehicle and about which the endless tracks are drivable, left and right hydraulic motors, a hydraulic circuit for connecting the fluid outlet of the left hydraulic motor to the fluid inlet of the right hydraulic motor and the fluid outlet of the right hydraulic motor to the fluid inlet of the left hydraulic motor, and a steering mechanism for receiving hydraulic pressure from the hydraulic pump and selectively distributing it to the first and second hydraulic motors. Each hydraulic motor is mountable to the frame and a respective one of the left and right sprocket wheels. Each hydraulic motor includes a fluid inlet and a fluid outlet. Each hydraulic motor is able to provide an additional motive power to the respective one of the left and right sprocket wheel in response to a hydraulic pressure being provided at fluid inlet thereof. The hydraulic circuit permits the flow of hydraulic fluid between the left and right hydraulic motors. The steering mechanism includes a first connecting element for connecting to the fluid inlet of the left hydraulic motor to provide a hydraulic pressure in response to a first steering input from a user, and a second connecting element for connecting to the fluid inlet of the right hydraulic motor to provide a hydraulic pressure in response to a second steering input from a user.

Preferably, the steering mechanism includes a power steering unit. Preferably, the steering mechanism further includes a steering wheel coupled to the power steering unit which can provide a hydraulic pressure in response to a rotation of the steering wheel by the user.

The objects, advantages and other features of the present invention will become more apparent and be better understood upon reading of the following non-restrictive description of the preferred embodiments of the invention, given with reference to the accompanying drawings. The accompanying drawings are given purely for illustrative purposes and should not in any way be interpreted as limiting the scope of the invention.

BRIEF DESCRIPTION OF THE DRAWINGS

FIG. 1 is a side view of a tractor including a steering system and an endless track attachment kit in accordance with an embodiment of the present invention.

FIG. 2 is a cross-sectional view of the sprocket wheel, hydraulic motor and torque arm in accordance with an embodiment of the present invention.

DESCRIPTION OF PREFERRED EMBODIMENTS OF THE INVENTION

Figure 3:
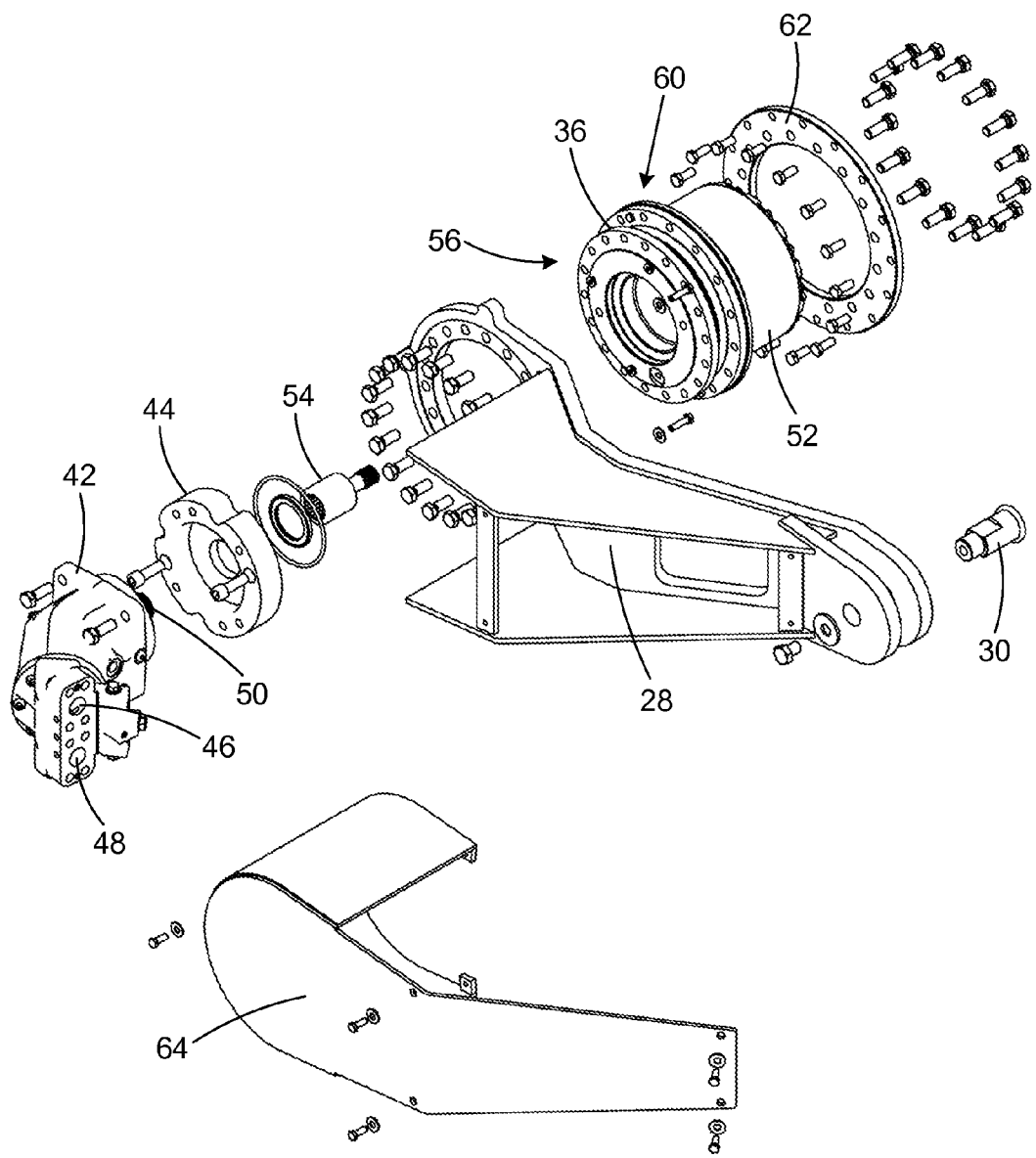
FIG. 3 is an exploded view of the torque arm and associated components in accordance with an embodiment of the present invention.

The present invention will be described more fully hereinafter with reference to the accompanying drawings in which like numerals refer to like elements throughout.

In the following description, the same numerical references refer to similar elements. The embodiments shown in the figures are preferred, for exemplification purposes only.

Although the preferred embodiments of the present invention as illustrated in the accompanying drawings comprise various components, etc., and consist of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations therebetween, as well as other suitable geometrical configurations may be used for the apparatus according to the present invention, as will be briefly explained herein and as can be easily inferred herefrom by a person skilled in the art, without departing from the scope of the invention.

With reference to FIG. 1, a tractor 10 has been has been adapted to run on a pair of endless tracks 12. The illustrated embodiment is further provided with a front plow 14 and is particularly well suited for snow grooming vehicles on ski slopes and snowmobile trails. It will be appreciated however that a steering system in accordance with the present invention could similarly be used in a different vehicle having a different purpose. Indeed, it will further be appreciated that a vehicle adapted with an endless track attachment kit in accordance with the present invention could similarly be used in different contexts and to different aims.

The tractor 10 comprises a motor for providing motive power and a transmission and differential for conveying that power to the propelling means. Prior to being adapted to run on tracks 12, a pair of conventional rear tractor wheels are used to propel the tractor 10. These rear wheels are then replaced by a pair of sprocket wheels 16, which engage and drive the tracks 12. The tractor 10 further comprises a hydraulic pump 84 (shown schematically in FIG. 6) which provides hydraulic power to variety of hydraulically actuated features at the front and rear of the vehicle, such as the position and orientation of the plow 14. This hydraulic pump 84 could be pre-installed in the tractor 10 prior to attachment of the tracks 12, or could be installed as part of the conversion.

The tracks 12 and sprocket wheels 16 can be provided as part of an attachment 18 for converting the tractor 10 to run on tracks. The attachment 18 also comprises a frame 20 for supporting the tractor 10, and a pair of track guides 22 about which tracks 12 are driven by the sprocket wheels 16. As is known in the art, the guides 22 can include a plurality of idler wheels 24 and/or sliders 26 to ensure a maximum contact between the tracks 12 and the ground and therefore maximum traction.

With additional reference to FIGS. 2 and 3, the attachment 18 further includes left and right torque arms 28 which are mounted at one end to the frame 20 via a pivoting joint 30 and at the other to a respective one of the left and right sprocket wheels 12. Each sprocket wheel 16 comprises a plurality of teeth 32 which engage the track 12 and are disposed around a hub 34. Each torque arm 28 is mounted on the outside of its respective hub 34. A tractor will typically provide motive power to each rear driven wheel by an axle (not shown) extending from a differential. The drive shaft is mounted to the inside of the hub 34, opposite the attachment of the torque arm 18 at end 38, and provides motive power to the tracks 12 from the motor.

The motor is therefore able to provide motive power to the sprocket wheels 16 in order to propel the tractor 10 forward or backward. A steering system 40 is further provided to enable the user to steer the tractor 10. The steering system 40 comprises, on each side of the attachment 18, a hydraulic motor 42 mounted to the respective torque arm 28. Each hydraulic motor comprises a fluid inlet 46 and a fluid outlet 48. Supplying a pressurised hydraulic fluid at the fluid inlet 46 will result in the rotation of a power output 50. Having turned the power output 50, the fluid can then return via the fluid outlet 48. It will be appreciated that the rotation of the power output 50 can be reversed by pumping hydraulic fluid in the opposite direction.

While the hydraulic motors 42 are mounted to the torque arms 28, their power outputs 50 are each connected to their respective sprocket wheels 16 so as to enable the driver to provide of an additional motive power thereto and thereby steer the tractor 10. Preferably, the sprocket wheels 16 are not mounted directly to the power outputs 50, but rather via a bearing assembly 36 disposed between each torque arm 28 and its respective sprocket wheel 16 in order to allow the latter to rotate about the former. A gear assembly 52, such as a planetary gear box, can also be disposed between the power output 50 of the hydraulic motor 42 and the sprocket wheel 16. The planetary gear box 52 is preferably a gear down which reduces the speed of rotation but increases torque.

In the embodiment illustrated in FIG. 3, the hydraulic motor 42 is mounted to the torque arm 28 via an adapter 44. A first portion 56 of the bearing assembly 36 is mounted to the torque arm 28, while each sprocket wheel 16 is mounted to a second portion 60 via an adapter ring 62. As such, the sprocket wheel 16 and the second portion 60 are rotatable with respect to the first portion 56 and the torque arm 28. A spline adapter 54 extends from the power output 50 into the planetary gear box 52 within the second portion 60, where it is able to impart an additional motive power of the hydraulic motor 42 to the sprocket wheel 16. The torque arm 28 preferably comprises a guard 64 (not shown in FIGS. 1 and 2) for protecting the hydraulic motor 42 and associated components.

It will be appreciated that the bearing assembly 36, the hydraulic motor 42, the adapter 44, the planetary gear box 52 and the adapter ring 62 have been illustrated as a single cross-hatched unit in FIG. 2.

Figure 4:
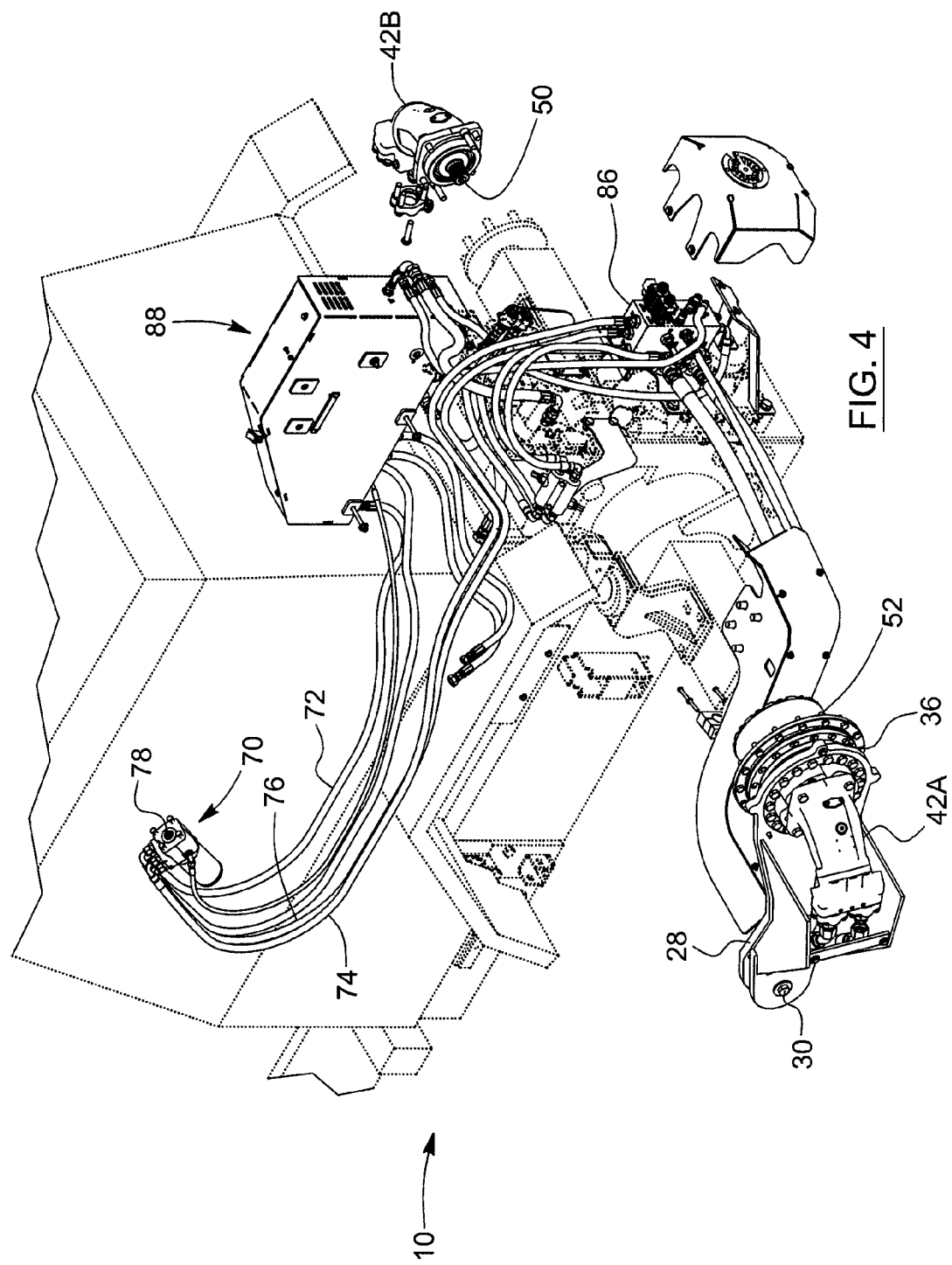
FIGS. 4 and 5 are partially exploded perspective views, from above and below, respectively, of a steering system in accordance with an embodiment of the present invention, with the tractor shown in ghost lines.
Figure 5:
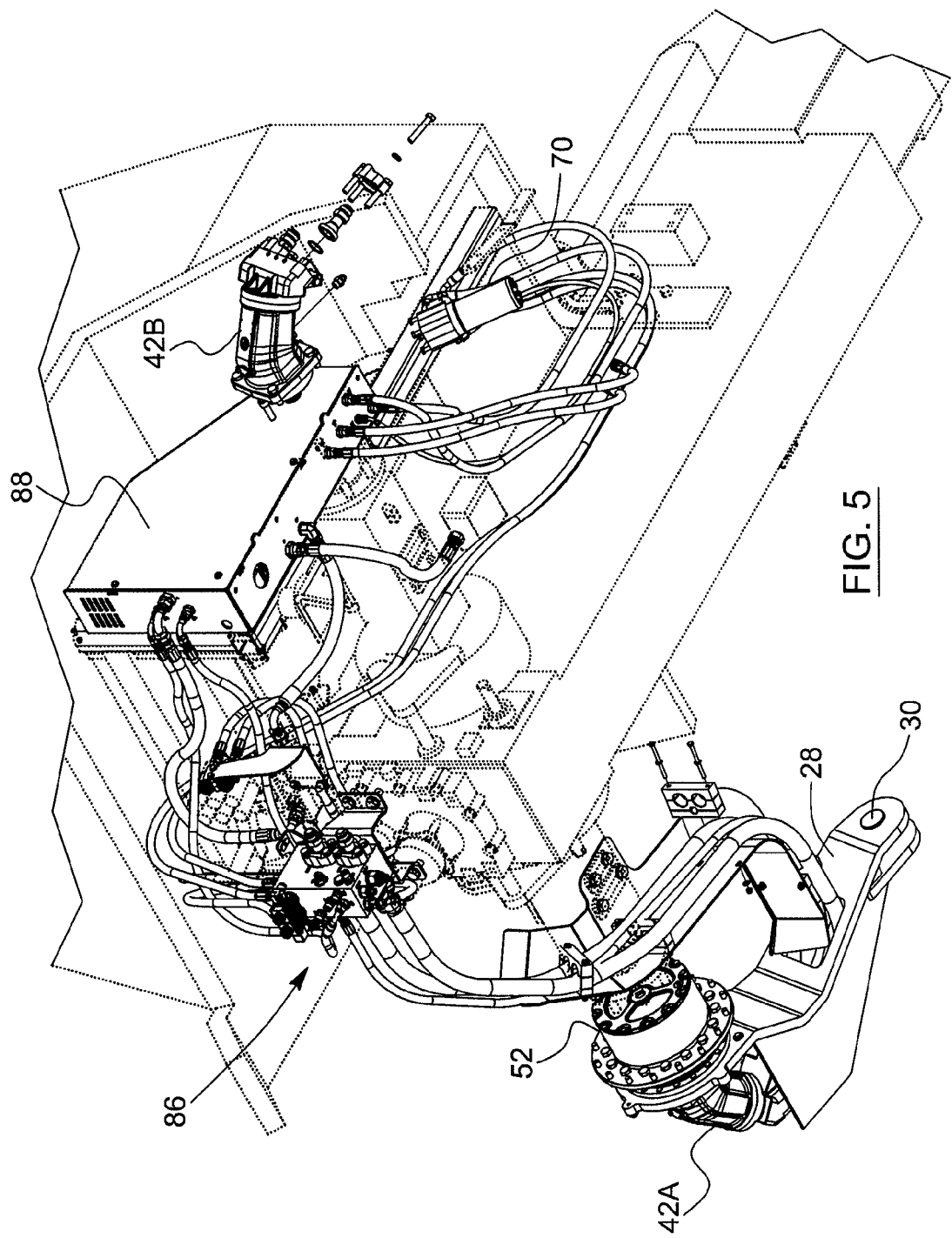

With additional reference now to FIGS. 4 and 5, in which the tractor 10 is shown in ghost lines, a steering mechanism 70 receives hydraulic pressure from the hydraulic pump 84 via a supply hose 72 and is used by the driver to selectively distribute it to the left or right hydraulic motors 42A, 42B via second hoses 74 and 76. The steering mechanism 70 is in fluid communication with the fluid inlets 46 of both hydraulic motors 42A, 42B. At its simplest, the steering mechanism 70 can be embodied simply as a valve or switch which enables the user to select to side to supply the additional motive power. For example, a simple valve may be provided with an input port for supplying hydraulic pressure, two output ports for convening that pressure to each of the hydraulic motors 42A, 42B. The valve allows the driver to select between three valve positions: 1) "off" wherein hydraulic pressure is supplied to neither motor 42A, 42B, 2) "left" wherein hydraulic pressure is supplied to the right hydraulic motor 42B, thereby turning the vehicle to the left, and 3) "right" wherein hydraulic pressure is supplied to the left hydraulic motor 42A, thereby turning the vehicle to the right.

Preferably however, the steering mechanism 70 is a power steering unit which is controlled by a steering wheel 82 (shown in FIG. 6) received at 78. As will be appreciated by one of ordinary skill in the art, a power steering unit 70, for example an orbital-type power steering unit, is typically used to assist a driver by translating a rotation of the steering wheel 82 into the displacement of a hydraulic fluid, which in turn is used to direct the vehicle's wheels. Moreover, a power steering unit serves to reduce the force required to steer the wheels by using a hydraulic pressure supplied by a hydraulic pump 84 to amplify the force input by the driver into the wheels.

As used herein, the power steering unit 70 selectively directs hydraulic pressure from the tractor's hydraulic pump 84 to the fluid inlet of the right or left hydraulic motor 42A, 42B in response to a turning of the wheel. As long as the user continues to turn the steering wheel 82, the additional hydraulic pressure will continue to be provided to the associated hydraulic motor 42A, 42B, thereby keeping that track 12 at a higher speed and continuing to turn the tractor 10. Advantageously, the use of a power steering unit 70 also provides a degree of feedback to the driver who will be able to sense when the tractor 10 is resisting the turning of the steering wheel 82.

Figure 6:
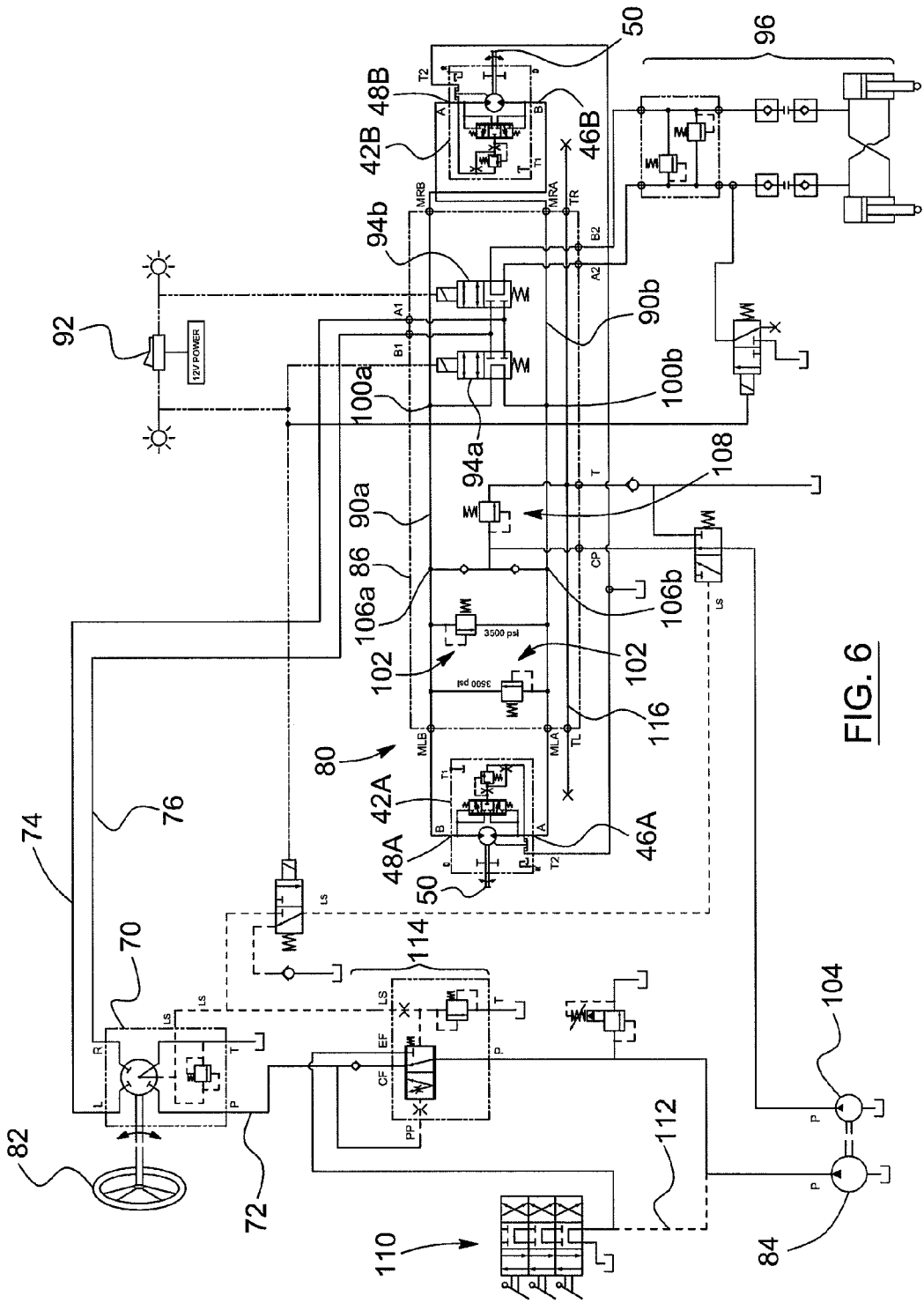
FIG. 6 is a schematic view of the hydraulic system associated with a steering system and an endless track attachment kit in accordance with an embodiment of the present invention.

With additional reference to FIG. 6, it will be appreciated that as the rotation of the sprocket wheels 16 drives the tractor 10 either forward or backwards, the power output 50 of each hydraulic motor 42A, 42B will rotate along therewith. This rotation will force hydraulic fluid through the hydraulic motor 42A, 42B between its inlet 46A, 46B and the outlet 48A, 48B. In order to accommodate this flow, a hydraulic circuit 80 is provided which connects the fluid outlet 48A of the left hydraulic motor 42A with the fluid inlet 46B of the right hydraulic motor 42B and the fluid outlet 48B of the right hydraulic motor 42B with the fluid inlet 46A of the left hydraulic motor 42A. This cross-connection, shown schematically by cross conduits 90a and 90b, allows hydraulic fluid to flow through and between the hydraulic motors 42A, 42B as the sprocket wheels 16 drive tractor 10 forward or backward. It will be appreciated that the pressure in the hydraulic circuit 80 will be at a minimum during this cycling is purely in response to the rotation of the power outputs 50 by the tractor's axles.

As described above, the tractor 10 may be steered to the left by turning the steering wheel 82 in counter-clockwise direction, which causes the power steering unit 70 to direct hydraulic pressure from the tractor's pump 84 through the hose 76 to the hydraulic circuit 80. The hydraulic circuit 80 comprises a control block 86 (also shown in FIG. 4) which receives the hydraulic pressure from the power steering unit 70 and distributes it to the appropriate motor 42. The tractor 10 preferably further comprises a steering box 88 which is in fluid communication with both the tractor pump 84 and the power steering unit 70 and is used to house valves and the like, such as a priority valve 114 which will be discussed in further detail below.

The hydraulic system illustrated in FIG. 6 further provides a steering mode selector switch 92 which permits the user to select between steering via the hydraulic motors 42A, 42B or via a "drag steer" system described in U.S. Pat. No. 5,343, 960. Specifically, the switch 92 activates one of a first or second selection valve 94a and 94b. Activating the second selection valve 94b allows hydraulic pressure from the first or second conduits 74 or 76 to pass therethrough and on to the drag steering system 96, which will not be described further herein. For the sake of the present description, it will be hereinafter be assumed that the selector switch 92 has activated the first selection valve 94a, that the second selection valve 94b remains deactivated and the drag steering system 96 is not operational.

The hydraulic pressure sent along hose 76 to the control block 86 will therefore pass through the first selection valve 94a and on to the first cross conduit 90a at junction 100a. Assuming the tractor 10 is travelling forward, a cross-flow in the hydraulic circuit 80 will have been induced and hydraulic fluid will be travelling from the outlet 48A of the left motor 42A to the inlet 46A of the right motor 42B along the first cross-conduit 90a. The additional motive power provided by the hydraulic pressure at junction 100a will be fed to the inlet 46B of the right motor 42B, thereby accelerating the right track 12 and turning the vehicle to the left.

Conversely, if the driver had turned the steering wheel 82 in the opposite direction and sent hydraulic pressure along the hose 74, this would have been fed to the second cross conduit 90b at junction 100b, which in turn would have provided hydraulic pressure to the inlet 46A of the left motor 42B.

Preferably, the control block 86 further comprises a pair of bypass valves 102 for protecting the motors 42A, 42B and associated hoses from too high pressure. These bypass valves 102 open a conduit between the first and second cross conduits 90a, bypassing the motors 42A, 42B, should the pressure in either conduit reach a certain predetermined threshold, such as 3500 psi.

A second pump 104 is preferably provided for ensuring a minimum operating pressure throughout the hydraulic system which, as will be appreciated by one of ordinary skill in the art, is generally required to assure the good functioning thereof. This second pump 104 can be the tractor's service gear pump and is connected to the first and second cross conduits 90a and 90b at junctions 106a and 106b via a charge valve 108 which keeps the supplied pressure from surpassing the minimum operating pressure, for example 400 psi.

In addition, the control block 86 preferably further comprises a drain conduit 116 which leads oil leaked from the hydraulic motors 42A, 42B back to the reservoir.

As discussed above, the tractor 10 may come equipped with various hydraulic features 110 which are powered by the pump 84. These features are normally connected directly to the pump 84 via a conduit 112, however given that the pump pressure is also used to steer the tractor 10, this conduit 112 is preferably disconnected and a priority valve assembly 114 is provided between the pump 84 and the hydraulically-actuated features 110. As such, it can be ensured that sufficient pressure is first and foremost distributed to the power steering unit 70 and that the activation of one of the features 110, accidental or otherwise, will not compromise the driver's ability to steer.

As being now better appreciated, the present invention is an improvement and presents several advantages over other related devices and/or methods known in the prior art. In particular, it will be appreciated that a steering system in accordance with the present invention, or indeed an attachment comprising such a steering system, advantageously enables the steering of a tracked vehicle by providing additional motive power to one or the other of the left and right tracks, rather than taking away motive power via braking or displacing a plow disposed therebehind.

In addition, for driving a tracked vehicle forwards or backwards it has been found that conveying motive power from a conventional motor, such as a diesel engine, to the tracks by hydraulic motors alone is not as efficient as conveying that power via a mechanical transmission. A steering system in accordance with the present invention can advantageously combine the more efficient forward/backward motive power of conventional tractor power train, while steering the left and right tracks by independent hydraulic control.

Of course, numerous modifications could be made to the above-described embodiments without departing from the scope of the invention, as apparent to a person skilled in the art.

The invention claimed is:

1. A steering system for a vehicle having left and right endless tracks for propelling the vehicle, left and right sprocket wheels for driving a respective one of the left and right endless tracks, a motor for providing primary motive power to the sprocket wheels and a hydraulic pump, the steering system comprising:
   a) left and right hydraulic motors each mounted to a respective one of the left and right sprocket wheels, each hydraulic motor comprising a fluid inlet and a fluid outlet, each hydraulic motor able to provide an additional motive power to the respective one of the left and right sprocket wheel in response to a hydraulic pressure being provided at the fluid inlet of the respective left and right hydraulic motor;
   b) a hydraulic circuit connecting the fluid outlet of the left hydraulic motor to the fluid inlet of the right hydraulic motor and the fluid outlet of the right hydraulic motor to the fluid inlet of the left hydraulic motor, thereby permitting the flow of hydraulic fluid between the left and right hydraulic motors; and
   c) a steering mechanism for receiving hydraulic pressure from the hydraulic pump and selectively distributing it to the first and second hydraulic motors, the steering mechanism being in fluid communication with the fluid inlet of the left hydraulic motor to provide the hydraulic pressure in response to a first steering input from a user, the steering mechanism also being in fluid communication with the fluid inlet of the right hydraulic motor to provide a hydraulic pressure in response to a second steering input from a user.

2. The steering system of claim 1, further comprising left and right planetary gear boxes disposed between the left and right hydraulic motors and respective left and right sprocket wheels.

3. The steering system of claim 1, wherein the steering mechanism comprises a power steering unit.

4. The steering system of claim 3, wherein the steering mechanism further comprises a steering wheel coupled to the power steering unit, the power steering unit providing a hydraulic pressure in response a rotation of the steering wheel by the user.

5. The steering system of claim 1, wherein the hydraulic circuit comprises a bypass valve connected across the fluid inlet and the fluid outlet of one of the hydraulic motors.

6. The steering system of claim 1, wherein the vehicle further has a hydraulic vehicle mechanism which is provided hydraulic pressure by the hydraulic pump, the steering system further comprising a priority valve ensuring a sufficient pressure is continually provided to the steering mechanism during operation, the priority valve being in fluid communication between the hydraulic pump and the hydraulic vehicle mechanisms.

7. An endless track attachment kit adaptable to a vehicle after removal of wheels from the vehicle, the vehicle having a motor and a hydraulic pump, the attachment kit comprising:
   a) left and right endless tracks for propelling the vehicle,
   b) left and right sprocket wheels for driving a respective one of the left and right endless tracks, the left and right sprocket wheels able to be provided motive power by the motor;
   c) a frame for supporting the vehicle, the endless tracks being drivable about the frame;
   d) left and right hydraulic motors each mountable to the frame and a respective one of the left and right sprocket wheels, each hydraulic motor comprising a fluid inlet and a fluid outlet, each hydraulic motor able to provide an additional motive power to the respective one of the left and right sprocket wheel in response to a hydraulic pressure being provided at the fluid inlet of the respective left and right hydraulic motor;
   e) a hydraulic circuit for connecting the fluid outlet of the left hydraulic motor to the fluid inlet of the right hydraulic motor and the fluid outlet of the right hydraulic motor to the fluid inlet of the left hydraulic motor, thereby permitting the flow of hydraulic fluid between the left and right hydraulic motors; and
   f) a steering mechanism for receiving hydraulic pressure from the hydraulic pump and selectively distributing it to the first and second hydraulic motors, the steering mechanism comprising a first connecting element for connecting to the fluid inlet of the left hydraulic motor to provide a hydraulic pressure in response to a first steering input from a user, the steering mechanism further comprising a second connecting element for connecting to the fluid inlet of the right hydraulic motor to provide a hydraulic pressure in response to a second steering input from a user.

8. The endless track attachment kit of claim 7, further comprising left and right planetary gear boxes mountable between the left and right hydraulic motors and respective left and right sprocket wheels.

9. The endless track attachment kit of claim 7, wherein the steering mechanism comprises a power steering unit.

10. The endless track attachment kit of claim 9, wherein the steering mechanism further comprises a steering wheel for coupling to the power steering unit, the power steering unit able to provide a hydraulic pressure in response a rotation of the steering wheel by the user.

11. The endless track attachment kit of claim 7, wherein the hydraulic circuit comprises a bypass valve connectable across the fluid inlet and the fluid outlet of one of the hydraulic motors.

12. The steering system of claim 7, wherein the vehicle further has one or more hydraulic vehicle mechanisms which are provided hydraulic pressure by the hydraulic pump, the steering system further comprising a priority valve assembly and for ensuring a sufficient pressure is continually provided to the steering mechanism during operation, the priority valve being connectable in fluid communication between the hydraulic pump and the one or more hydraulic vehicle mechanisms.

* * * * *